United States Patent [19]

Hougen

[11] 4,193,721
[45] Mar. 18, 1980

[54] ARBOR FOR ANNULAR HOLE CUTTER

[76] Inventor: Everett D. Hougen, G-5072 Corunna, Flint, Mich. 48504

[21] Appl. No.: 4,330

[22] Filed: Jan. 18, 1979

Related U.S. Application Data

[63] Continuation-in-part of Ser. No. 962,952, Nov. 22, 1978, abandoned.

[51] Int. Cl.² .................. B23B 47/00; B23B 51/04
[52] U.S. Cl. ................................... 408/68; 408/204
[58] Field of Search .............. 408/200, 201, 204, 209, 408/199, 239, 82, 226, 68, 703, 205, 206, 208

[56] References Cited

U.S. PATENT DOCUMENTS

| | | | |
|---|---|---|---|
| 58,924 | 10/1866 | Webster | 408/204 X |
| 2,184,919 | 12/1939 | Miller | 408/204 X |
| 2,484,150 | 10/1949 | Brown | 408/204 |
| 2,754,864 | 7/1956 | Elsy | 408/204 |
| 3,825,362 | 7/1974 | Hougen | 408/68 |
| 4,090,804 | 5/1978 | Haley | 408/204 X |

Primary Examiner—William R. Briggs
Attorney, Agent, or Firm—Barnes, Kisselle, Raisch & Choate

[57] ABSTRACT

An arbor for an annular hole cutter wherein a resiliently compressible sleeve is connected to a central pilot pin in the cutter and is expanded radially into tight frictional contact with the bore of the arbor so that a compression spring which biases a pointed pilot pin axially outwardly at the center of the cutter and compresses progressively as the cutter penetrates into the work will expand slowly by reason of said frictional contact and the slow recovery rate of the compressible sleeve when the cutter penetrates through the under surface of the workpiece.

19 Claims, 5 Drawing Figures

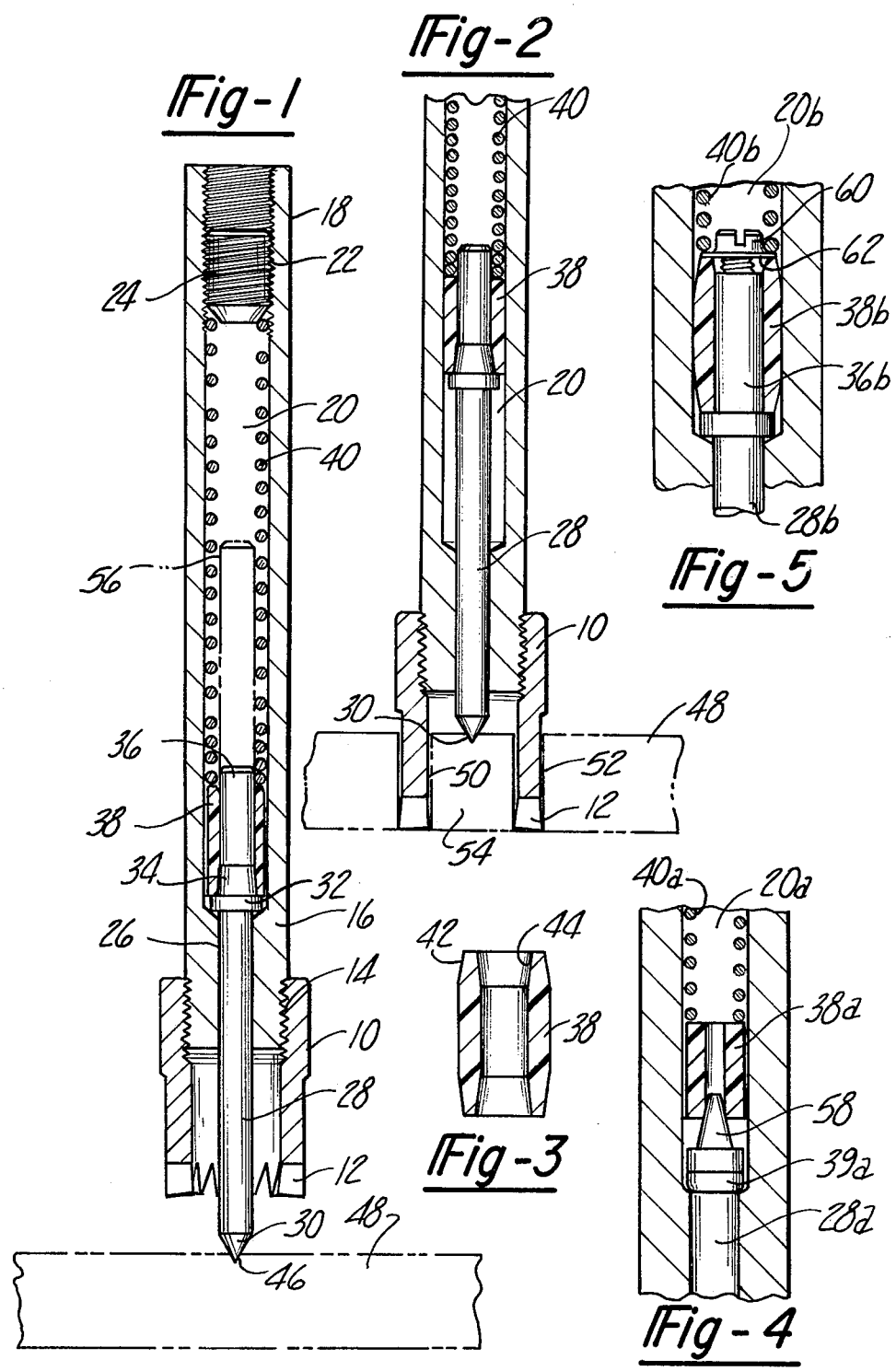

ARBOR FOR ANNULAR HOLE CUTTER

This application is a continuation-in-part of applicant's prior copending application Ser. No. 962,952, filed Nov. 22, 1978, now abandoned.

This invention relates to an arbor for an annular hole cutter.

Arbors for annular hole cutters are frequently provided with a pointed pilot pin for centering the cutter on a prick punch depression in the workpiece at the center of the hole to be cut. Such pilot pins are backed by a relatively heavy compression spring in the bore of the arbor to prevent lateral displacement of the cutter as the teeth at its leading end engage and initiate cutting of a circular groove in the workpiece around a central circular slug. However, as the cutter penetrates progressively into the workpiece, the spring compresses progressively and the force applied to the pilot pin becomes progressively greater. Experience has shown that if the initial compression on the spring is sufficient to assure a good centering action at the initiation of a cut, then, depending upon the thickness of the workpiece, the spring force on the pilot pin at the end of the cut, that is, when the cutter penetrates through the under surface of the workpiece, may be so high as to project the central slug cut from the workpiece with an extremely high velocity. With a conventional annular cutter and a relatively thick workpiece the central slug becomes a high velocity projectile capable of causing severe damage or bodily injury.

The primary object of this invention is to utilize a compression spring of sufficient strength to hold the pilot pin in the centered position with the desired relatively high force at the initiation of the cut while at the same time avoiding the danger of the central slug being propelled with a high velocity when the cutter penetrates through the under surface of the workpiece.

A more specific object of this invention resides in the provision of a resilienty deformable plastic sleeve associated with the pilot pin in the bore of the arbor, the sleeve being radially expended into tight frictional engagement with the bore to cause the compression spring to expand relatively slowly at a controlled rate when the cutter penetrates through the workpiece.

Another object of this invention resides in the provision of a radially expandable plastic sleeve arranged in the bore of the arbor between the compression spring and the pilot and arranged such that, in response to the progressively increasing compression of the spring resulting from the progressively increasing penetration of the cutter into the workpiece, the sleeve is subjected to a progressively increasing axial force which produces a progressively increasing frictional contact between the sleeve and the bore of the arbor so that, when the cutter penetrates through the under surface of the workpiece, the spring will expand at a relatively slow rate regardless of the extent to which it was compressed by the retraction of the pilot within the bore of the arbor because the resilient plastic sleeve has a much slower recovery rate than the spring.

Other objects, features and advantages of the present invention will become apparent from the following description and accompanying drawing, in which:

FIG. 1 is a vertical sectional view of an annular cutter and arbor of the present invention, the cutter being shown in a position prior to initiating a cut in the workpiece;

FIG. 2 is a fragmentary view similar to FIG. 1 and showing the cutter penetrating through the under surface of the workpiece;

FIG. 3 is a longitudinal sectional view of the resilient plastic sleeve utilized in the arbor;

FIG. 4 is a fragmentary sectional view of a modified form of arbor; and

FIG. 5 is a fragmentary sectional view of another modified form of arbor.

In FIG. 1 an annular cutter 10 having cutting teeth 12 around its lower or leading end is threaded as at 14 on the lower end of an arbor 16. The upper end of the arbor, designated 18, is shown plain, but can have any desired configuration so as to adapt it for mounting to a conventional rotary driven spindle. Arbor 16 has a central cylindrical bore 20 which is threaded at its upper end as at 22 to receive a screw 24. The lower end of bore 20 has a reduced diameter as at 26 for supporting a pilot pin 28 for axial sliding movement. Pilot pin 28 has a pointed lower end 30. Adjacent its upper end pilot pin 28 is formed with an enlarged radial shoulder 32 and has a tapered portion 34 above shoulder 32, the tapered portion 34 terminating in a cylindrical upward extension 36 on the pilot pin. Shoulder 32 limits the extent to which the pointed end 30 of the pilot pin can project axially beyond the cutting teeth 12.

A resilient plastic sleeve 38 having a slow rate of elastic recovery is telescoped over the shoulder portion 34 and the cylindrical extension 36 of the pilot pin. A compression spring 40 in bore 20 has its upper end abutting screw 24 and its lower end abutting the upper end of sleeve 38. Although sleeve 38 may have a configuration in its free, uncompressed state of a straight cylindrical sleeve of uniform inner and outer diameter, it is preferably constructed as shown in FIG. 3. More specifically, at its opposite ends sleeve 38 is provided with conical outer and inner surfaces 42,44, respectively, so that the opposite ends of the sleeve are somewhat tapered both externally and internally. In its free state, sleeve 38 has an inner diameter which corresponds generally with the diameter of the cylindrical extension 36 of the pilot pin. The outer diameter of sleeve 38 in its free state is preferably slightly less than the diameter of bore 20 in the arbor.

The arbor may be assembled by first telescoping sleeve 38 over extension 36 and tapered portion 34 of the pilot pin. When the sleeve is so assembled with the pilot pin its outer diameter is still preferably slightly less than the diameter of bore 20. Thereafter, the pilot pin with the sleeve 38 thereon is inserted downwardly through the open upper end of bore 20 to the position shown in FIG. 1. Compression spring 40 is then inserted into bore 20 and screw 24 is threaded into the open end of the bore to close the bore and to apply the desired amount of compression to the spring. If desired, sleeve 38 can be inserted axially in bore 20 after the pilot pin is deposited therein, in which case spring 40 can serve to telescope the sleeve over the upper end of the pilot pin.

The initial compression of the spring is determined by the adjustment of screw 24 and is such that the axial downward force applied to pilot pin 28 through sleeve 38 is sufficient to cause the pointed end 30 of the pilot pin to firmly engage a prick punch depression 46 in the workpiece 48 at the center of the hole to be formed. The initial force applied to the pilot pin is such that, as spring 40 is compressed slightly when the cutting teeth 12 engage the upper surface of workpiece 48, the pilot pin will resist the lateral forces which result from the engagement of the rotating cutter with the workpiece. This initial compression of spring 40 applies an axial force to sleeve 38 which causes the sleeve to be compressed axially and thereby radially expanded. When sleeve 38 expands it frictionally engages the cylindrical inner surface of bore 20.

As the arbor is fed progressively in a downward direction, the cutting teeth 12 form an annular cylindrical groove 50 in the workpiece, the outer diameter of which corresponds to the desired diameter of hole 52 formed in the workpiece. This results in the formation of a central cylindrical slug 54 within cutter 10. As the cutter 10 penetrates into the workpiece, spring 40 is progressively compressed and the axial downward force applied to the upper end of sleeve 38 becomes progressively greater. This in turn produces a progressively increasing frictional contact between sleeve 38 and bore 20. This results from the fact that the pointed end 30 of pilot pin 28 does not move axially as the annular cutter and the arbor are fed progressively downwardly. Thus, when teeth 12 of the arbor penetrate through the under surface of workpiece 48, the frictional engagement between sleeve 38 and bore 20 is very considerable. As soon as teeth 12 of the cutter penetrate through the under surface of the workpiece, pilot pin 28 is free to shift axially outwardly to the position shown in FIG. 1 under the bias of spring 40. However, the frictional contact between sleeve 38 and bore 20 as the cutter penetrates through the workpiece is very substantial and this frictional contact or drag will prevent spring 40 from expanding rapidly. The relatively slow recovery rate of the plastic sleeve to its original shape, as compared with the rapid recovery rate of the spring, retains the frictional drag between sleeve 38 and bore 20 for a sufficiently long enough time to retard the recovery rate of the spring without diminishing its ability to eject the slug. Thus, the central slug 54 is ejected from within the cutter at a relatively slow rate as compared to the velocity it would have if spring 40 were permitted to expand freely from its axially compressed condition. It will therefore be appreciated that, since the force applied to sleeve 38 is proportional to the thickness of the workpiece and since this force results in progressively increasing frictional contact with bore 20 of the arbor, even though the workpiece may be relatively thick, the rate at which the central slug 54 will be ejected may be readily controlled as desired by the initial compression applied to the spring by screw 24 and by the configuration and size of sleeve 38.

It is preferred to dimension sleeve 38 so that its outer diameter in its free, unstressed condition is slightly less than the diameter of bore 20 so that the sleeve can be easily inserted into and withdrawn from bore 20 and, particularly, through the threaded section 22. This is important because experience has shown that, from time to time, the pointed end 30 of the pilot may become dull and the pilot will have to be resharpened or replaced. To remove the pilot from the arbor, screw 24 is threaded out of the arbor, spring 40 is withdrawn, and pilot pin 28 is retracted outwardly through the open upper end of the arbor. Under some circumstances it may be desirable to form a relatively long cylindrical extension at the upper end of the pilot pin as indicated in broken lines at 56 in FIG. 1. This enables the pilot pin to be more readily withdrawn from within bore 20 in the event there is a tendency for the pilot pin and sleeve 38 to stick in bore 20.

It will be appreciated that the tapered portion 34 will tend to produce an immediate and substantial radial expansion of the lower end portion of sleeve 38 for producing the desired frictional contact with bore 20 as spring 40 is progressively compressed. The amount of frictional force between the sleeve and the bore of the arbor is controlled by the force applied to the sleeve by spring 40, the size and configuration of sleeve 38, and the material from which the sleeve is made. A longer sleeve will tend to produce greater frictional resistance. It is preferably formed from a polyurethane tube since polyurethane possesses good wear properties, is unaffected by oil lubricants, and has an even slower recovery rate than rubber.

The arrangement shown in FIG. 4 differs only slightly from that shown in FIGS. 1 and 2 and is adapted for arbors having a relatively small inner diameter. In such cases the diameter of bore 20a may be insufficient to accommodate both the cylindrical extension 36 and the sleeve 38 shown in FIG. 1. Accordingly, for relatively small diameter arbors the upper end of pilot pin 28a is provided with a shoulder 32a and a short conical extension 58 which may be formed integrally with the pilot pin or as a separate member. In this arrangement sleeve 38a has relatively small inner and outer diameters, the inner diameter being substantially smaller than the base of the conical extension 58, but slightly larger than the smaller upper end thereof. Thus, with the arrangement shown in FIG. 4, as the spring 40a compresses sleeve 38a is telescoped axially over conical extension 58 which causes it to radially expand rapidly and frictionally grip the bore 20a of the arbor. In other respects the operation of the arbor shown in FIG. 4 is similar to that shown in FIGS. 1 and 2.

A slightly different arrangement is shown in FIG. 5. The pilot pin 28b has a cylindrical extension 36b with a threaded opening at its upper end for the reception of screw 60. In this arrangement, after the sleeve 38b is telescoped over extension 36b and the pilot pin is inserted into bore 20b of the arbor, screw 60 can be tightened by means of a long screwdriver inserted through the open upper end of the arbor in order to place sleeve 38b in axial compression so that it will radially expand and firmly grip the bore 20b. With such an arrangement the frictional contact between sleeve 38b and bore 20b is predetermined and is independent of the axial compression of spring 40b. However the flange 62 on screw 60 is preferably formed as a separate washer, in which case the screw may be used to apply the initial axial compression to sleeve 38b and thereafter spring 40b, acting through the loose washer, will provide an increasingly progressive axial compression to sleeve 38b as the cutter penetrates into the workpiece. Then, when the cutter penetrates through the workpiece, the slow recovery rate of the sleeve will maintain the desired frictional drag on bore 20b for a sufficiently long time to eject the slug slowly by the restrained expansion of spring 40b.

I claim:

1. In an arbor for an annular cutter of the type having means at its upper end for mounting the arbor on a rotary driven spindle and means at its lower end for mounting an annular cutter thereon, said arbor having an axial bore therein extending to the lower end thereof, a pointed pilot pin slideable axially in said bore and adapted to extend outwardly from the lower end of the arbor so that its pointed end projects axially beyond the lower end of the cutter, a compression spring in said bore biasing the pilot pin axially to said projected position, the pilot pin being retracted axially inwardly in said bore in response to the cutter penetrating into a workpiece to compress the spring and thereby increase the biasing force thereof on the pilot pin, that improvement which comprises, a resiliently deformable plastic sleeve movable axially in said bore with said pilot pin under the bias of said spring, means for expanding said plastic sleeve radially outwardly into tight frictional engagement with said bore for opposing to a high degree the biasing force of said spring on the pilot pin whereby said frictional engagement prevents the spring from expanding freely when the leading edge of the cutter penetrates through the bottom face of the workpiece.

2. The improvement called for in claim 1 wherein said expanding means are movable axially in said bore with said pilot pin.

3. The improvement called for in claim 1 wherein said plastic sleeve has an elastic recovery rate substantially slower than the recovery rate of said compression spring.

4. The improvement called for in claim 3 wherein said expanding means includes the lower end of the compression spring abutting against the upper end of the sleeve.

5. The improvement called for in claim 3 wherein said expanding means comprises a tapered member in said bore movable with said pilot pin and having a diameter at its larger lower end greater than the inner diameter of said sleeve, said sleeve having the lower end portion thereof telescoped and seated on said tapered member, the lower end of said spring bearing downwardly on the upper end of said sleeve.

6. The improvement called for in claim 5 wherein said tapered member is formed integrally with said pilot pin.

7. The improvement called for in claim 1 wherein the means for radially expanding the sleeve comprises adjustable screw means on the pilot pin for compressing said sleeve axially.

8. The improvement called for in claim 7 wherein the upper end of the bore is closed by a removable plug, said screw means being accessible for adjustment through the upper end of said bore when said plug is removed.

9. The improvement called for in claim 3 wherein the lower end of said spring bears axially against the upper end of said sleeve, the lower end of said sleeve being in axial driving relation with the pilot pin.

10. The improvement called for in claim 3 wherein said spring applies an axial force to the pilot pin by bearing against the upper end of the sleeve, the other end of the sleeve being in axially driving relation with the pin so that, as the spring is progressively compressed in response to the progressively increasing penetration of the cutter into the workpiece, a progressively increasing axial force is applied to the upper end of the sleeve to progressively increase the frictional engagement between the sleeve and bore.

11. The improvement called for in claim 10 wherein the lower end of the sleeve is axially fixed relative to the pilot pin.

12. The improvement called for in claim 10 wherein the pilot pin has a radially outwardly extending shoulder thereon against which the lower end of the sleeve is adapted to abut.

13. The improvement called for in claim 12 wherein the pilot pin has a stem portion projecting upwardly from said shoulder through said sleeve.

14. The improvement called for in claim 13 wherein the stem portion of the pin has an outwardly tapered section adjacent said shoulder for expanding the lower end of the sleeve.

15. The improvement called for in claim 3 wherein the outer periphery of said sleeve is tapered axially inward in a downward direction adjacent its lower end.

16. The improvement called for in claim 3 wherein the lower end portion of said sleeve has its outer periphery tapering axially downwardly and radially inwardly and its inner periphery tapering axially downward and radially outwardly.

17. The improvement called for in claim 15 wherein the pilot pin extends upwardly through said sleeve and has a portion tapering radially outward in a downward direction, said tapered portion of the pilot pin engaging the inner tapered peripheral portion of said sleeve.

18. The improvement called for in claim 3 wherein opposite ends of the sleeve are tapered on the inner and outer surfaces thereof so that the ends are thinner than portions of the sleeve intermediate its ends.

19. The improvement called for in claim 1 wherein the outer diameter of the sleeve throughout its length when in its free unstressed condition is less than the diameter of said bore.

* * * * *